United States Patent [19]

Crawford

[11] 4,044,788
[45] Aug. 30, 1977

[54] DIAPHRAGM ACTUATED VALVES

[75] Inventor: Edward N. Crawford, Florissant, Mo.

[73] Assignee: ACF Industries, Incorporated, New York, N.Y.

[21] Appl. No.: 535,957

[22] Filed: Dec. 23, 1974

[51] Int. Cl.$^2$ .................................... G05D 11/00
[52] U.S. Cl. ...................................... 137/117; 60/290
[58] Field of Search ............... 137/115, 116, 117, 513; 60/290

[56] References Cited

U.S. PATENT DOCUMENTS

| 2,391,551 | 12/1945 | Cruzan et al. | 137/116 |
| 3,430,437 | 3/1969 | Saussele et al. | 60/290 |
| 3,479,816 | 11/1969 | Masters | 60/290 |
| 3,520,320 | 7/1970 | Crawford et al. | 60/290 |
| 3,611,715 | 10/1971 | Tatsutomi et al. | 60/290 |
| 3,616,811 | 11/1971 | Shimosaki | 137/115 |
| 3,774,628 | 11/1973 | Norton et al. | 137/115 |
| 3,812,673 | 5/1974 | Muroki et al. | 60/290 |
| 3,835,646 | 9/1974 | Ranft et al. | 60/290 |
| 3,849,984 | 11/1974 | Toda et al. | 60/290 |
| 3,903,695 | 9/1975 | Nakada | 60/290 |
| 3,919,843 | 11/1975 | Arnaud et al. | 60/290 |

Primary Examiner—William R. Cline
Assistant Examiner—H. Jay Spiegel

[57] ABSTRACT

A diaphragm actuated valve having inlet, outlet and bypass ports is provided with two independently operating valves on a diaphragm rod stem of a diaphragm assembly. One of the valves operates as a main air valve and the other valve provides positive relief of air pressure when that pressure reaches a predetermined value. The preferred embodiment of the valve structure is a sheet metal construction including a cap closing and delimiting a diaphragm chamber. The cap structure has a diaphragm stop means integrally formed with it which limits diaphragm movement during valve operation.

3 Claims, 2 Drawing Figures

DIAPHRAGM ACTUATED VALVES

BACKGROUND OF THE INVENTION

This invention relates to diaphragm actuated relief valves and in particular to a bypass and pressure relief valve useful in internal combustion engine automotive systems. While the invention is described in detail with respect to automotive systems, those skilled in the art will recongnize the wider applicability of the invention disclosed hereinafter.

Diaphragm actuated bypass and relief valves, useful in automotive systems, are well known in the art. For example, the U.S. Pat. No. 3,520,320, to Crawford et al, issued July 14, 1970, discloses one particular form of a bypass and pressure relief valve. While the prior art in general, and the Crawford valve in particular, work well for their intended purpose, valves prior to the disclosure of the invention described hereinafter exhibited several disadvantages. For example, the bypass valve portion of the device described in the above-referenced Crawford et al patent operated against the bias of the main spring of the valve. While the pressure at which the relief valve operated could be varied, the amount of variation was limited by other overall considerations of valve operation. That is, in the bypass function of the diaphragm valve disclosed, the bypass valve portion operated against the spring pressure of the diaphragm spring which ordinarily is a relatively large spring requiring considerable force to overcome it. While some control is obtainable by varying the area of the valve member, such control was insufficient in all applications. In addition, prior art devices did not include means for controlling diaphragm movement. Consequently, large scale diaphragm movement was possible under the various modes of operation of an internal combustion engine in a motor vehicle, for example. Such large scale deflections of the diaphragm valve can reduce operating life of the diaphragm, the valve members or damage other exhaust systems components because the valve premits too high a quantity of air to enter the system.

The invention disclosed hereinafter eliminates these prior art deficiencies by providing a novel structural combination which includes integrally formed stop means for controlling diaphragm movement. Bypass relief is arranged so that a bypass valve operates against its own independent spring member, the spring constant of which may be preselected for a particular application. Consequently, greater operational flexibility is provided and valve life is improved. Limited diaphragm movement also limits the amount of air entering the exhaust system to an amount compatible with other system components.

One of the objects of this invention is to provide an improved valve structure having self-contained diaphragm stop means.

Another object of this invention is to provide a diaphragm operated bypass and pressure relief valve having an independent, positive acting valve for pressure relief.

Another object of this invention is to provide two positive acting valves on a single valve stem.

Other objects of this invention will become apparent to those skilled in the art in light of the following description and accompanying drawings.

SUMMARY OF THE INVENTION

In accordance with this invention, generally stated, a diaphragm actuated valve includes a diaphragm assembly having a valve stem operatively connected to a flexible diaphragm. The valve stem has a pair of valves associated with it. One of the valves moves with the valve stem and functions to regulate main air flow through the valve. The other valve moves independently of the valve stem and functions to provide a bypass air passage when over-pressure conditions are sensed. The valve structure includes means for limiting diaphragm assembly movement during valve operation.

DESCRIPTION OF THE PREFERRED EMBODIMENT

Figure 2:
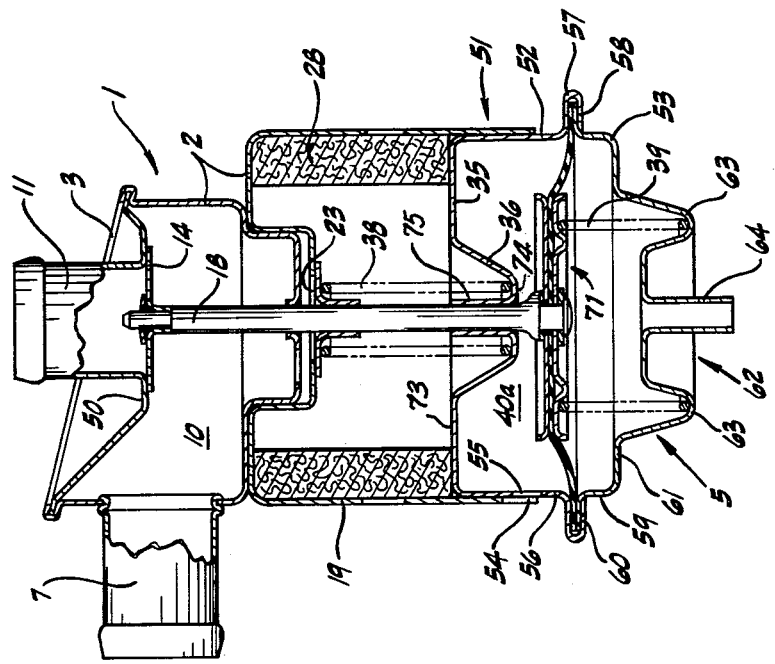
FIG. 2 is a sectional view, partly broken away, of a second illustrative embodiment of valve of this invention.

In the drawings, where like reference numerals are used to indicate like parts, reference numeral 1 indicates the diaphragm actuated bypass and pressure relief valve of this invention. As there shown, the valve 1 includes a body portion 2, which, for the purposes of this specification, is defined to include an air connection portion 3, a muffler portion 4, and a diaphragm valve chamber portion 5, generally all of sheet metal construction.

The air connection portion 3 structure is delimited by a side wall 6, a top wall 8, and a bottom wall 9 jointed to one another in the configuration illustratively shown in the drawings.

The side wall 6 has an opening in it, which permits the insertion and attachment of an inlet nipple 7. As indicated, valve 1 conventionally is constructed from sheet metal and the inlet nipple 7 may be integrally formed with the wall 6 or the nipple 7 may be manufactured separately and later interconnected by any convenient method. Welding or brazing works well, for example, where separate manufacture is utilized. The side wall 6 generally is cylindrical and it, together with the top wall 8 and the bottom wall 9, delimits a chamber 10. The upper end of the side wall 6, referenced to FIG. 1, has a flange 12 integrally formed with it.

The top wall 8 is attached to the wall 6 along the flange 12. Attachment may be made by any convenient method, and crimping or staking the flange 12 against the wall 8 works well for the attachment method.

The wall 8 also has an opening in it, and an outlet nipple 11 is attached to the wall 8 along the opening. Again, the nipple 11 may be integrally formed with the wall 8 or it may be manufactured separately and secured to the valve 1 structure by any convenient method. In the illustrative embodiment, however, the nipple 11 is integrally formed with the wall 8. Integral construction is preferred because the wall 8 is formed to define a substantially flat annular area 13 surrounding the nipple 11 on the chamber 10 side of the wall 8, which area defines a valve seat 50 for a valve member 14. The valve member 14 is described hereinafter.

Conventionally, an internal combustion engine in which the valve 1 has utility is provided with an air pump, not shown, driven by the crankshaft of the engine by a belt, for example. An air discharge pipe is connected from the air pump to the inlet nipple 7 of the valve 1. The outlet nipple 11 of the valve 1 is connected to the exhaust manifold of the engine by a second air pipe, not shown. A main air passage through the valve 1 is defined by the nipple 7, the chamber 10 and the outlet nipple 11.

The bottom 9 of air connection portion 3 is integrally formed with the side 6, and has a reduced diameter part forming a cup 15 projecting downwardly from it. A pervious web 16 covers one end of the cup 15. The web 16 has a plurality of open areas in it, not shown, between a multiplicity of ribs 70 defining the web 16. The web 16 also defines a support bushing 17 for supporting a diaphragm valve stem 18, later described in detail.

The muffler portion 4 of the valve 1 is an open bottom structure formed from a side wall 19 and a top wall 20. The top wall 20 defines a receiver 21 sized to receive the cup 15 of air connection portion 3 in a tight, press fit. Receiver 21 has an open mouth for receiving the cup 15, and has a wall 22 partially closing it at some predetermined distance removed from the open mouth, such distance being sufficient to accommodate the axial length of the cup 15. Wall 22 has a central opening 23 through it. The outer boundary of the wall 22 defines a valve seat 24 about an annular area surrounding the opening 23. The side wall 19 has at least one opening in it, not shown, for venting the interior of the muffler portion 4 to the atmosphere.

The muffler portion 4 carries some form of sound deadening material 28 for reducing the sound of any escaping air, which may be vented under pressure through the opening in side wall 19. Sound proofing materials suitable for use are well known in the art.

A valve member 25 includes an annular valve closure portion 26 and a cylindrical part 27 having an axial opening therethrough. The part 27 is sized to receive the valve stem 18 in a slip fit. The valve member 25 is free to move between at least a closed position where the valve closure portion 26 abuts the seat 24, and an open position where the valve closure portion 26 is spaced from the seat 24. Movement of the valve member 25 is a response predicated on certain conditions described hereinafter.

diaphragm valve chamber 5 includes a first section 29 and a second section 30 joined to one another along a rim 31. The diaphragm chamber 5 houses a diaphragm assembly 71 which includes a flexible diaphragm 32. The diaphragm assembly 71 is attached to the valve stem 18 along an end 33 of the stem 18. The diaphragm 32 conventionally is constructed from some form of flexible material and is attached to the diaphragm chamber 5 along the rim 31, at the outer annular margin of the diaphragm.

The section 29 part of valve chamber 5 includes a generally cylindrical side wall 34 and a keeper wall 35, integrally constructed with one another. Wall 35 has a central receptacle 36 formed in it. The receptacle 36 has an axial opening 72 through it, the opening 72 being defined in part by a hub structure 37. Receptacle 36 is an inverted frustum in cross section. Hub 37 receives the valve stem 18 in a slip fit and, together with the bushing 17, provides radial support for the valve stem 18. A spring 38 is mounted over the valve stem 18, and seats against the receptacle 36 outboard of hub 37, along the smaller area plane of the frustum-shaped receptacle 36. Spring 38 is a conventional coil compression spring which is chosen in accordance with certain design factors described hereinafter.

A diaphragm spring 39 is mounted within a chamber 40 delimited by the structure forming the diaphragm valve chamber 5. Spring 39 is biased between the wall 35 along the outboard extension of the larger area plane of the frustum-shaped receiver 36, and a plate 41 of the diaphragm assembly 71. The side wall 34 of section 29 has at least one opening in it, which is utilized to mount a tube 42 in a press fit. Tube 42 commonly is coupled to the intake manifold of an internal combustion engine by any convenient method. Conventional tubing works well, for example. Consequently, the suction or vacuum present in the intake manifold during engine operation is sensed by and is present in the chamber 40. As indicated above, the rim 31 is integral with the side wall 34. Rim 31 defines a channel 48.

Figure 1:
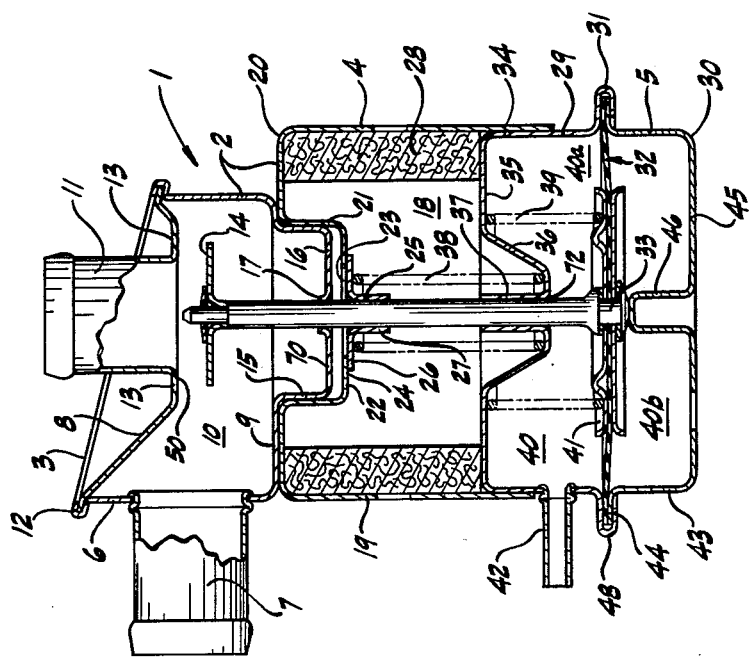
FIG. 1 is a sectional view, partly broken away, of one illustrative embodiment of valve of this invention.

Section 30 of valve chamber 5 includes a side wall 43 having a radially outwardly extending flange 44 which is interconnected with the rim 31 both to interconnect the sections 29 and 30 and to grip the diaphragm 32 along its outer periphery. The channel 48 may be formed during that operation. That is, an end 49 of side wall 34 may be folded over to form the channel 48 and interlock the diaphragm 32 and flange 44 in position. A top 45 of section 30 has an integral, axially inwardly extending stop means 46 formed in it. Stop means 46 is aligned with the end 33 of stem 18 so that the stop means may limit travel of the stem in one direction of movement of the diaphragm assembly 71. In the embodiment of FIG. 1, the section 30 must have an opening in it to permit pressure equalization between a chamber area 40a and a chamber area 40b, formed from the chamber 40 when the diaphragm 32 is fixed in position, or the diaphragm 32 must include means for equalizing pressure in each of the two areas. Various means for equalizing the pressure are shown and discussed in the above-referenced Crawford U.S. Pat. No. 3,520,320, issued July 14, 1970, and are not described in detail. Those details, not forming a part of this invention, may be obtained from the Crawford et al patent, if desired.

The operation of the pressure relief bypass valve of FIG. 1 is as follows. Under normal operating conditions, air received under pressure from the air pump, not shown, will enter the valve 1 at the inlet nipple 7. In the normal operating position of the valve 1, shown in FIG. 1, the air passes through the chamber 10 to the exhaust manifold via the outlet nipple 11. The valve member 14 is in the open position shown because the pressure in the respective chambers 40a and 40b are such that the spring 39 forces the diaphragm assembly 71 against the stop means 46. The diaphragm assembly 71 has no effect on the operation of the valve as the spring 39 maintains the valve member 14 spaced from the valve seat 50. When deceleration occurs, the vacuum applied at the tube 42 will become greater and there will exist a pressure differential between the respective areas 40a and 40b of the diaphragm valve chamber 5. The vacuum present in the area 40a will permit the higher pressure present in area 40b to overcome the bias of the spring 39 and move the diaphragm downwardly. When the diaphragm 32 has been pulled downwardly by the differential pressure described, the valve member 14 will seat against the seat 50 and shut off air flow through the outlet nipple 11, and consequently to any exhaust manifold operatively connected to the outlet nipple 11. When the pressures in the areas 40a and 40b again reach equilibrium, the biasing spring 39 will drive the diaphragm assembly 71 against the stop means 46, opening the valve 1 and permitting air passage from the outlet nipple 11.

When internal combustion engine powered vehicles are being driven at higher road speeds, over approximately 50 mph, air pumps commonly operated in conjunction with the internal combustion engines are capable of generating greater quantities of air than are required for operation of the exhaust system. For this reason, the valve 1 is designed to function as an over pressure relief valve. As the air pump air volume output increases, pressure at the inlet nipple 7 also increases. As noted previously, the spring 39 is prevented from moving the diaphragm assembly 71 beyond that assembly's contact with the stop means 46. Consequently, the valve member 14 is prevented from opening the outlet nipple 11 beyond some preselected amount. The spring constant of the spring 38 is chosen so that some predetermined air pressure in chamber 10 will overcome the bias of the spring 38, lifting the valve member 25 from the seat 24, and permitting air to exit the valve 1 along a path through the opening 23 and the muffler portion 4 of the valve 1.

The air pressure within the chamber 10 which overcomes the bias of spring 38, thereby lifting the valve member 25, can be varied by a number of considerations. As indicated, spring 38 stiffness may be chosen so that the valve member 25 lifts at the desired pressure. In addition, the areas of the valve members 25 and 14, along with the corresponding areas of the valve seats 24 and 50, may be manipulated in various designs to ensure that surplus air is bypassed through the opening 23 at any speeds exceeding some predetermined speed. It also is possible, through selection of the variables, to ensure that air always is available in the exhaust manifold for burning additional hydrocarbons. As thus described, the relief valve member 25 is operated independently of the diaphragm assembly 71 to vent excess air at all pressure above a preselected pressure.

The embodiment of FIG. 2 is substantially similar to the embodiment shown in FIG. 1, except for certain constructional features in the diaphragm valve chamber portion 5 which permits the valve of FIG. 2 to incorporate a fail safe provision. The fail safe provision is intended to prevent air input to the exhaust system whenever loss of vacuum occurs for any reason.

In FIG. 2, where like reference numerals are utilized for like parts, the valve 1 includes the body portion 2 comprising the air connection portion 3, the muffler portion 4 and a diaphragm valve chamber portion 51. Only the diaphragm valve portion 51 is changed from the embodiment of FIG. 1 and, consequently, only that part is described in detail.

Diaphragm valve chamber portion 51 includes a first section 52 and a second section 53 which delimit the chamber areas 40a and 40b. Again, side wall 19 of muffler portion 4 is sized to receive the diaphragm chamber part 51 in a tight, press fit. In the embodiment of FIG. 2, the side wall 19 of muffler portion 4 has an opening 54 in it, which aligns with an opening 55 in a side wall 56 of the section 52. Consequently, the chamber area 40a is at atmospheric pressure. Side wall 56 has an outwardly projecting rim 57 having an overturned edge 58 defining a channel between overturned portions of the rim. A wall 73 of section 52 defines a receptacle 74 which in the embodiment of FIG. 2, acts as a seat for the spring 38 and provides a hub structure 75 that permits axial movement of the valve stem 18. The wall 73, receptacle 74 and hub 75 correspond to similar structure in FIG. 1 and are not described in detail.

The section 53 includes a side wall 59 having a perpendicularly outwardly extending flange 60 integrally formed with it. Flange 60 also performs a same function as flange 44 in the embodiment of FIG. 1, and is clamped with the diaphragm 32 in the channel defined by the rim 57.

Side wall 59 is formed to define a stop means 61 outboard of a central hub 62. The hub 62 includes an annular spring seat 63 and a central tube 64. In the embodiment of FIG. 2, the spring 39 is positioned between the seat 63 of the section 53 and a diaphragm plate 65. The spring 39, in the embodiment of FIG. 2, is biased so as to force the diaphragm 32, and consequently the valve stem 18 and the valve member 14, against the seat 50, absent any other considerations. The tube 64 is operatively connected so as to sense the vacuum of the intake manifold of an internal combustion engine. As indicated, under normal operation, the chamber 40a portion of the diaphragm chamber 51 is at atmospheric pressure and the vacuum connection to the chamber 40b causes a pressure unbalance on opposite sides of the diaphragm 32. This pressure unbalance permits the pressure in chamber area 40a to compress the spring 39, removing the valve member 14 from the seat 50, thereby opening the outlet nipple 11 to the air supply.

As with the valve of FIG. 1, when a vehicle is being driven at road speeds above certain speeds, commonly about 50 mph, air pumps utilized with internal combustion engines are capable of supplying greater quantities of air than required for proper operation of the exhaust system. Absent other considerations, pressure increases in chamber 10 acts on the valve member 14 so to force it downwardly, as referenced to FIG. 2, further opening the outlet 11 and permitting a greater quantity of air to enter the exhaust system. Diaphragm assembly 71 movement, however, is restricted by stop means 61 which engages the plate 65 of the assembly 71 at a maximum open position for the valve member 14. This engagement prevents further valve member 14 movement and permits only a predetermined quantity of air to enter the exhaust system for the engine. Further pressure build-up in the chamber 10 overcomes the bias of the spring 38 and forces the valve member 25 from its abutment with seat 24, permitting air to exit the valve 1 via the opening 23, muffler 4 path described in conjunction with the embodiment of FIG. 1.

The main structural difference between the embodiment of FIGS. 1 and 2 is that the valve of FIG. 2 normally is intended to be closed and requires some manifold vacuum before the main air valve member in the chamber 10 opens. Consequently, it is a fail safe device in that the loss of manifold vacuum for any reason closes the valve member 14 and prevents further insertion of air into the exhaust system. This is an important consideration in the design of environmentally acceptable exhaust systems for internal combustion engines. In general, the design of emission control systems for internal combustion engines contemplates use of a catalytic converter as an important part of the system. Catalytic converters are very sensitive to excessive heat. Excessive heat can destroy the converter. While either of the valves embodiments shown and described may be utilized with such converters, the valve of FIG. 2 provides an added safety feature in that air combustion in the manifold system will not be supplied unless some source of negative pressure is connected to the tube 64. A second difference between the valves of FIGS. 1 and 2 involves operation of the valves during deceleration. As described, the valve of FIG. 1 is designed to close air flow to the exhaust system during deceleration of the vehicle, thereby preventing any backfire that might occur if air were continuously injected during the deceleration.

Numerous variations, within the scope of the appended claims, will be apparent to those skilled in the art in light of the foregoing description and accompanying drawings. Thus, the design silhouette of the various components forming the valve may be varied. Likewise, while those components were described as constructed from sheet metal, those skilled in the art will recognize that one or more of the components may be of cast metal construction in other embodiments of this invention. While the stop means of each embodiment was described as integrally constructed with the respective ones of the sections 30 and 53, equivalent stop means may be constructed separately and inserted in the valve 1 to limit travel of the diaphragm assembly. As illustrated by the embodiments of FIGS. 1 and 2, alternative designs for the stop means also are available. These variations are merely illustrative.

Having thus described the invention, what is claimed and desired to be secured by Letters Patent is:

1. In a valve structure including an air connection part having inlet, outlet and bypass openings in it, said air connection part including a valve seat operatively associated with said outlet opening, a diaphragm chamber part having a diaphragm assembly including a flexible diaphragm dividing said chamber into a first section and a second section, a valve stem having first and second ends, said first valve stem end being attached to said diaphragm, and a valve member mounted to said second valve stem end, the improvement which comprises means for providing fail safe operation of said valve, said means including a first spring mounted in said first section of said diaphragm chamber part adapted to bias the diaphragm so as to seat said valve member, means for supplying a source of negative pressure to said chamber coupled to said chamber on the same side as said diaphragm as said first spring, said first section of the diaphragm chamber part including stop means for limiting the movement of said diaphragm integrally formed in it, a muffler portion between said air connection part and said diaphragm chamber portion, said muffler portion including a valve seat about said bypass opening, a second valve member mounted to said valve stem, said second valve member being movable independently of said valve stem, and means for biasing said second valve member towards said seat about said bypass opening.

2. In a valve structure including an air connection part having inlet, outlet and bypass openings, a muffler portion mounted to said air connection part about said bypass opening, a diaphragm chamber part mounted to said muffler part, and means for varying pressure in said diaphragm chamber, the improvement which comprises means for mounting a first valve member and a second valve member for independent operation in said valve structure, said last mentioned means including a diaphragm assembly having a flexible diaphragm mounted in said diaphragm chamber part and dividing said diaphragm chamber part into a first section and a second section, a valve stem operatively connected to said flexible diaphragm and movable in response to flexing of said diaphragm, said valve stem having a first end operatively connected to said diaphragm and a second end remote from said diaphragm, said first valve member being mounted along said second end of said valve stem and movable therewith, said first valve member adapted to close said outlet opening in at least one flexible position of said diaphragm, said second valve member mounted to said valve stem and movable thereon independently of said valve stem movement, said second valve member being movable between at least a first and a second position, one of said first and said second positions adapted to close said bypass opening, means for biasing said second valve member toward said closed position, stop means in said diaphragm chamber part, said stop means adapted to limit the flexing of said diaphragm in one direction of movement, diaphragm biasing means mounted in said second section of said diaphragm chamber part and adapted to bias said diaphragm toward the closed position of said first valve member, said pressure varying means including means for connecting a source of negative pressure to said second section of said diaphragm chamber part.

3. The improvement of claim 2 wherein said stop means is integrally formed in said second section of said diaphragm chamber part.

* * * * *